P. ARBOGAST.
Manufacture of Glass-Coated Wire.
No. 220,908. Patented Oct. 28, 1879.
     
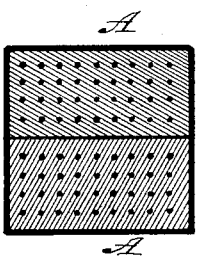
 
 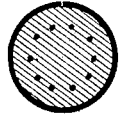
Witnesses
Philip Arbogast, Inventor.
By Connolly Bros & Wright
Attorneys.

UNITED STATES PATENT OFFICE.

PHILIP ARBOGAST, OF PITTSBURG, PENNSYLVANIA, ASSIGNOR TO HIMSELF, JOHN M. PATTERSON, ANDREW HOWARD, H. C. VAN TINE, AND WILLIAM I. MILLER, OF SAME PLACE.

IMPROVEMENT IN THE MANUFACTURE OF GLASS-COATED WIRE.

Specification forming part of Letters Patent No. 226,908, dated October 28, 1879; application filed June 20, 1879.

*To all whom it may concern:*

Be it known that I, PHILIP ARBOGAST, of Pittsburg, in the county of Allegheny and State of Pennsylvania, have invented certain new and useful Improvements in the Manufacture of Glass-Coated Wire; and I do hereby declare the following to be a full, clear, and exact description of the invention, such as will enable others skilled in the art to which it pertains to make and use it, reference being had to the accompanying drawings, which form part of this specification, in which—

Figures 1, 2, 3, 4, 5, and 6 represent the various stages of manufacture; Fig. 7 is a transverse section of double system. Fig. 8 shows in elevation the end plates and broken joints. Figs. 9, 10, and 11 are modifications.

This invention relates to the manufacture of glass-coated wires, the novelty being in the method of making and the article produced.

It consists in taking a metal trough, laying in its bottom a flat layer of glass or other similar substance, then laying on top of the glass one or more wires, and, finally, filling in on top some more glass or similar substance, the two portions of glass being at welding-heat.

It consists, further, in the method of aligning the wires and squaring the ends of the glass by the use of die-plates at the ends of the trough; and, further, in the finished article.

More particularly my invention is as follows: I take a trough, A, of metal, preferably sheet-iron, and forming a U-shaped receptacle, having the upper side open. This is of suitable length—say, twenty or twenty-five feet long. Into this I insert a bottom lining, $a$, of glass or other vitreous material, by pouring, rolling, drawing, or other equivalent means of insertion, or strips of cold waste window-glass may be cut, and, after fitting, the whole reheated. I next lay on top of this bottom lining $a$ the wire or wires $b$, which are to be coated, and then insert a second layer of glass or vitreous material throughout the length of the trough, after which the whole may be passed through rolls or dies, or other appliances, to give it a finished exterior appearance. A second and third or more repetition of the alternating operations of laying the wires and glass may be gone through, where it is desired to increase the number of wires to be coated.

Fig. 1 shows a section of the trough of sheet-iron, with the first layer of glass on its bottom.

Fig. 2 shows the same with the wires laid on.

Fig. 3 shows the same with the completing layer of glass.

Figs. 4, 5, and 6 illustrate a larger and deeper trough with two layers of wires and three of glass.

Figs. 7 and 8 show how two sections may be joined together, so as to break joint, in order to stiffen the whole.

In Fig. 8 is also exhibited my mode of aligning the wires and squaring the ends. I take two plates, B B, which are perforated at the points corresponding to the lines the various wires are to be placed in. Then I insert the ends of the wires through the perforated plates, and after pulling them straight the next layer of glass is introduced. The plates B B while keeping the wires in position, also mold the ends of the section square.

Fig. 9 exhibits in two forms an obvious modification of my method, in which, instead of a trough, I take a flat plate, E, place one layer of glass first, then the wires, and finally the completing layer of glass. This may be drawn through a die to form a semicircle, and two of these may be placed together, as before.

In Fig. 10, I take the trough-glass and wires, as in Fig. 3, and pass all through rolls or shaping dies and produce the unwelded form shown by Fig. 11.

The first and subsequent layers of glass may be cold cuttings from waste window or plate glass, softened and welded by reheating, or they may be freshly-made glass inserted, by pouring or pulling a lump of glass out to a flat band and laid in the trough. This may be done all by hand, or the insertion of the various layers may be effected by drawing the trough under a vessel having a suitably-shaped opening at the bottom for the glass to ooze through into the trough. After being introduced, and while still pliable, the different layers may be leveled off by a suitable scraper or rubber. At the same time the whole method can be perfectly carried out by hand, and, therefore, I do not confine myself to either way of proceeding.

The finished article is a sheet iron or metal trough, having the glass or vitreous material in layers, welded to each other, and the wires between them. The advantage of the open-sided trough is, that if anything should go wrong, and it should be desired to save the material, the glass can all be removed from the trough by allowing it to cool and then breaking it out from the back. In this way a spoiled section can be stripped in a few minutes.

The die-plates, after serving to mold the ends square are removed, and the whole then carried to the reheating-oven where it is annealed; but, if desired, the reheating and annealing may be dispensed with. The molded square ends are a great advantage in case the product is to be used for telegraphic purposes, because to couple section to section the ends should be square, and if not squared by my plan, they must be ground, and the pressure on a grindstone is apt to start cracks in the glass, which, if athwart, the wires become a channel for the capillary action of water, and this would give a chance for a ground connection and consequent destruction of the circuit. But being molded square at first, the section is complete and ready for use.

The iron trough may be coated with tar, pitch, or other material, to prevent it from rusting.

I claim as my invention—

1. The method of coating wires with vitreous material, consisting in laying the wire or wires between two separate layers of vitreous material and consolidating the whole by heat or pressure, or both, substantially as described.

2. The method of forming sections of incased glass-coated wires, consisting in inserting a lining of glass in a trough of sheet iron or other metal, then laying the wires on said lining, next inserting a top layer of glass, and finally consolidating the whole by heat or pressure, or both, substantially as described.

3. As a new article of manufacture, a system of glass-coated wires or wires coated with vitreous material incased in a metallic shell open at one side, substantially as described.

4. As a new article of manufacture, a system of glass-coated wires, the glass having molded ends, substantially as described.

5. The combination, with the trough A, of the detachable perforated end plates B B, substantially as set forth.

In testimony that I claim the foregoing I have hereunto set my hand this 19th day of June, 1879.

PHILIP ARBOGAST.

Witnesses:
JAMES J. McTIGHE,
T. J. McTIGHE.